US008368987B1

(12) United States Patent
Woo et al.

(10) Patent No.: US 8,368,987 B1
(45) Date of Patent: Feb. 5, 2013

(54) OPTICAL PROCESSING DEVICE

(75) Inventors: Seungbum Woo, Bedford, MA (US); Jefferson Wagener, Morristown, NJ (US); Susumu Nakaya, Sakura (JP); Takaaki Ishikawa, Sakura (JP)

(73) Assignees: Nistica, Inc., Bridgewater, NJ (US); Fujikura, Ltd. (JP)

( * ) Notice: Subject to any disclaimer, the term of this patent is extended or adjusted under 35 U.S.C. 154(b) by 0 days.

(21) Appl. No.: 13/234,083

(22) Filed: Sep. 15, 2011

(51) Int. Cl.
*G02B 26/08* (2006.01)
*G02B 6/42* (2006.01)

(52) U.S. Cl. ............. 359/223.1; 359/204.4; 359/298; 385/18

(58) Field of Classification Search ............. 359/201.2, 359/204.4, 204.5, 223.1, 290, 298; 385/18
See application file for complete search history.

(56) References Cited

U.S. PATENT DOCUMENTS

2006/0239608 A1*  10/2006  Akashi ............................ 385/18
2009/0028501 A1    1/2009  Wagener

* cited by examiner

Primary Examiner — William Choi
(74) Attorney, Agent, or Firm — Mayer & Williams PC

(57) ABSTRACT

Provided is an optical processing device including: a beam emission portion which includes a plurality of optical fibers; a dispersion element which disperses a beam emitted from one optical fiber of the plurality of optical fibers; a condenser lens which concentrates the beam passing through the dispersion element; and an optical path conversion optical system which converts an optical path of the beam passing through the condenser lens so that the beam is incident to one of the other optical fibers of the plurality of optical fibers. An optical axis of the condenser lens is inclined with respect to an optical axis direction from the beam emission portion to the optical path conversion optical system. The inclination angle is set so that a maximum difference in focal depth of a plurality of beams having different wavelengths obtained by the dispersion element becomes smaller.

12 Claims, 7 Drawing Sheets

OPTICAL PROCESSING DEVICE

TECHNICAL FIELD

The present invention relates to, for example, a wavelength-selective optical processing device.

BACKGROUND ART

Conventionally, an optical processing device has been used which includes a dispersion element (for example, a grating) dispersing a beam signal from an input path and an optical path conversion optical system allowing each of the dispersed beams to be incident to any of a plurality of output paths.

As such an optical path conversion optical system, a DMD (Digital Micromirror Device) is known that includes a plurality of micromirror elements, each of which is individually actuatable (for example, refer to Patent Document 1). The DMD may selectively switch an optical path of a reflected beam to any one of multiple output paths in a manner such that the directions of the mirror elements are adjusted to control the reflection direction of the beam.

SUMMARY OF THE INVENTION

Problem to be solved by the Invention

However, according to the conventional optical processing device, since the beams dispersed for wavelengths by the dispersion element have different focal depth positions in accordance with the wavelengths, loss may increase in accordance with the wavelength.

This problem may be solved by the combination of multiple lenses having different wavelength dependencies, but in this case, since the optical system becomes complicated, a problem arises in terms of cost or the like.

The invention is made in view of such circumstances, and an object thereof is to provide an optical processing device capable of suppressing loss with a simple structure.

Means for Solving the Problem

An optical processing device according to the present invention includes: a beam emission portion which includes a plurality of optical fibers; a dispersion element which disperses a beam emitted from one optical fiber of the plurality of optical fibers; a condenser lens which concentrates the beam passing through the dispersion element; and an optical path conversion optical system which converts an optical path of the beam passing through the condenser lens so that the beam is incident to one of the other optical fibers of the plurality of optical fibers, in which an optical axis of the condenser lens is inclined with respect to an optical axis direction from the beam emission portion to the optical path conversion optical system, and the inclination angle is set so that a maximum difference in focal depth of a plurality of beams having different wavelengths obtained by the dispersion element becomes smaller.

The optical path conversion optical system may include a mirror element which reflects the beam at a first reflection point and an intermediate mirror which reflects the beam reflected from the mirror element at an intermediate reflection point, the mirror element reflects the beam reflected from the intermediate mirror at a second reflection point, and the condenser lens forms a focus of the beam at the first reflection point.

The optical path conversion optical system may allow each of the beams dispersed by the dispersion element to be incident to different one of the other optical fibers depending on the wavelengths of the beams.

Advantageous Effect of the Invention

According to the present invention, the optical axis of the condenser lens is inclined, and the inclination angle is set so that the maximum difference in focal depth position of a plurality of beams having different wavelengths obtained by the dispersion element becomes smaller. Accordingly, variation in focal position of the plurality of beams can be reduced, and hence reflection loss can be suppressed in the optical path conversion optical system.

Accordingly, the high coupling efficiency can be obtained in the wide wavelength region without making the optical system complex, and hence the output characteristics can be improved.

EMBODIMENTS FOR CARRYING OUT THE INVENTION

Hereinafter, an optical processing device according to an embodiment of the present invention will be described with reference to the drawings.

Figure 1:
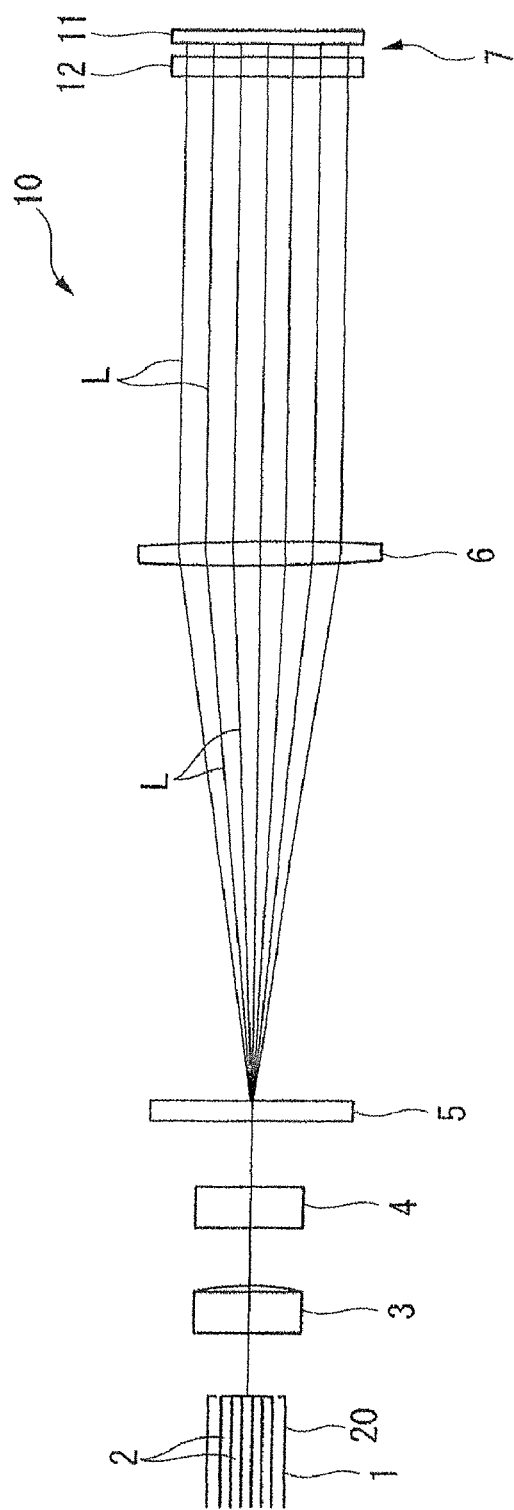
FIG. 1 is a schematic diagram illustrating an optical processing device according to an embodiment of the invention.
Figure 2:
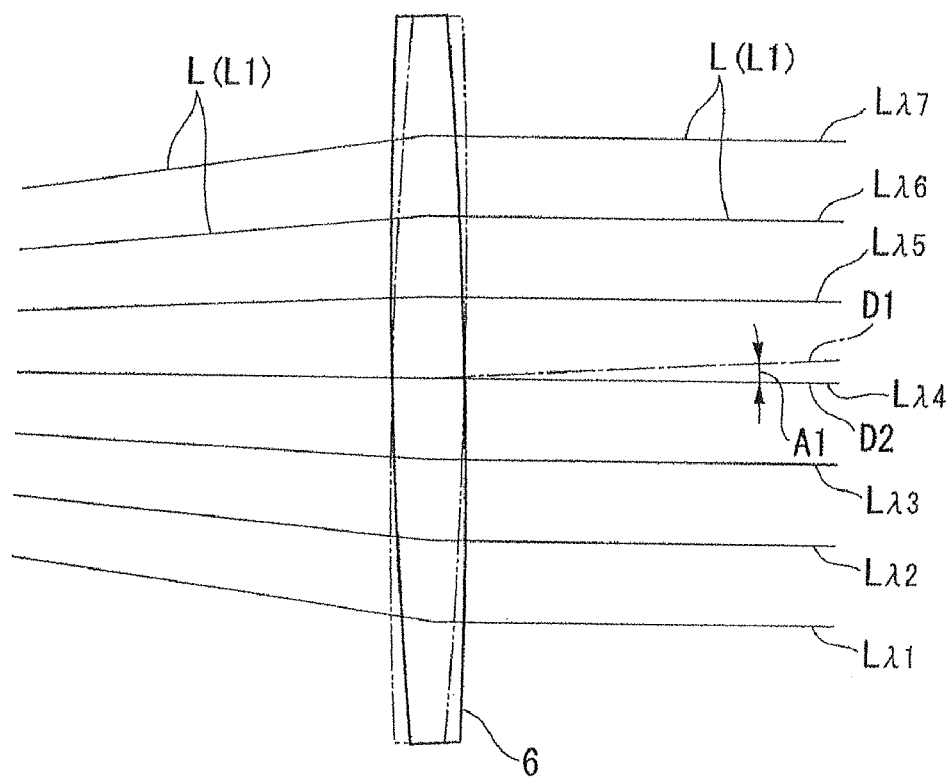
FIG. 2 is a schematic diagram illustrating a lens (condenser lens) of the optical processing device of FIG. 1.
Figure 3:
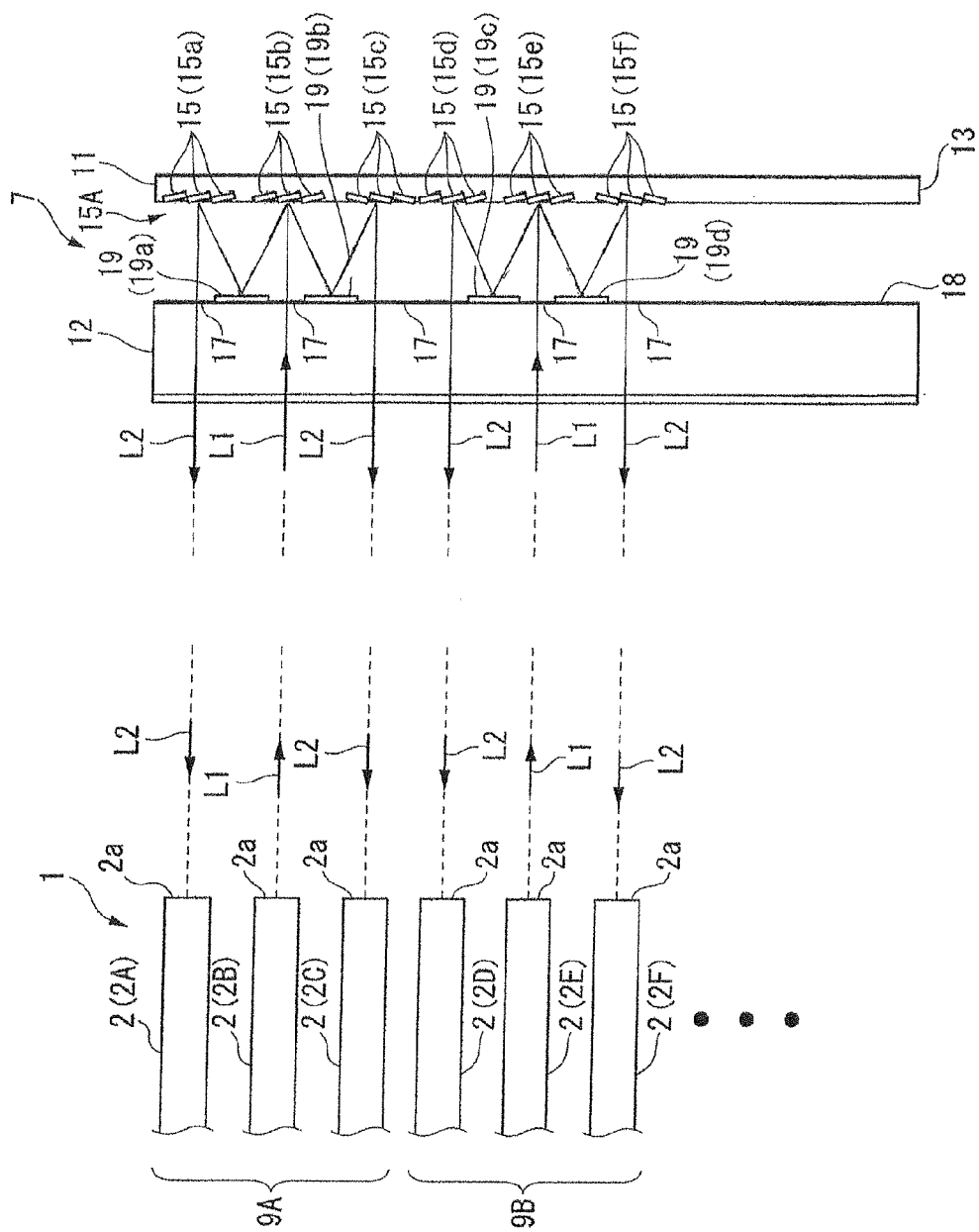
FIG. 3 is a schematic diagram illustrating an optical path conversion optical system and a front end portion of an optical fiber of the optical processing device of FIG. 1.
Figure 4:
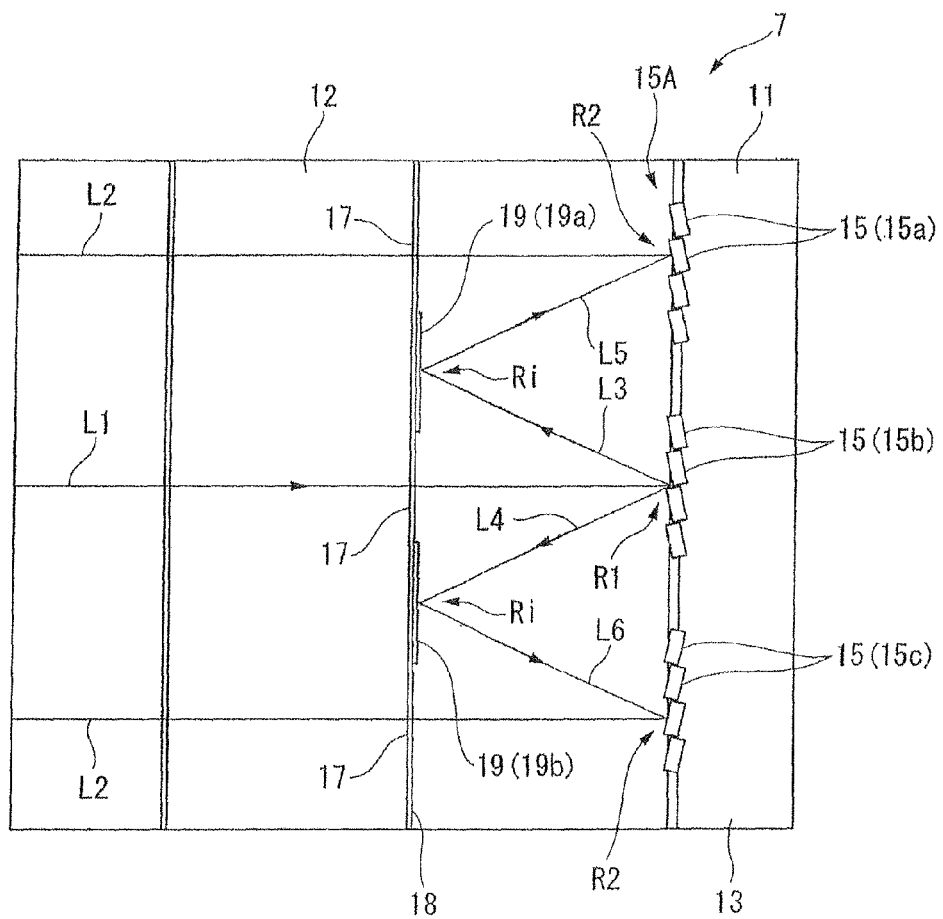
FIG. 4 is a schematic diagram illustrating the optical path conversion optical system of the optical processing device of FIG. 1.

FIG. 1 is a schematic diagram illustrating an optical processing device 10 according to an embodiment of the present invention. FIG. 2 is a schematic diagram illustrating a lens 6 (scan lens) (condenser lens) of the optical processing device 10. FIG. 3 is a schematic diagram illustrating an optical path conversion optical system 7 and a front end portion of an optical fiber 2 of the optical processing device 10. FIG. 4 is a schematic diagram illustrating the optical path conversion optical system 7 of the optical processing device 10.

As shown in FIG. 1, the optical processing device 10 includes: a beam emission portion 1 which includes a plurality of optical fibers 2; lens 3 and 4 (collimating lenses); a grating 5 (dispersion element) which disperses a beam passing through the lenses 3 and 4; a lens 6 (scan lens) (condenser lens) which focuses a beam passing through the grating 5; and the optical path conversion optical system 7 which converts an optical path of the beam passing through the lens 6.

As shown in FIGS. 1 and 3, the beam emission portion 1 includes a plurality of optical fibers 2 that propagate a beam input to and output from an external device and a holding portion 20 which holds the fibers arranged in a line in the width direction. As the beam emission portion 1, for example, a beam emission portion having an optical fiber array may be used.

As shown in FIG. 3, the optical fiber 2 (2A to 2F) may include a plurality of optical fiber groups 9 (9A and 9B).

The optical fiber groups 9 include a plurality of optical fibers 2 that is capable of being optically coupled with each other. In the example shown in the drawing, the optical fibers 2A to 2C constitute a first optical fiber group 9A, and the optical fibers 2D to 2F constitute a second optical fiber group 9B. In the example shown in the drawing, each of the optical fiber groups 9 includes three optical fibers 2, but the present invention is not limited thereto. For example, the optical fiber group may include two or more optical fibers 2.

In the optical fiber group 9A, the optical path of a beam L1 emitted from the optical fiber 2B (input path) may be converted by the optical path conversion optical system 7, so that the beam may be incident as a returned beam L2 to the optical fibers 2A and 2C (output paths). In the optical fiber group 9B, the optical path of a beam L1 emitted from the optical fiber 2E (input path) may be converted by the optical path conversion optical system 7, so that the beam may be incident as a returned beam L2 to the optical fibers 2D and 2F (output paths).

It is desirable that the front end surface 2a of the optical fiber 2 as the input path and the front end surface 2a of the optical fiber 2 as the output path be located at the same position in the optical path direction. In the example shown in the drawing, the front end surfaces 2a of all optical fibers 2 (2A to 2F) are located at the same position in the optical path direction.

The grating 5 may disperse the beam L (beam L1) emitted from the optical fiber 2 into multiple beams having different beams $L_{\lambda 1}$ to $L_{\lambda 7}$ having different wavelengths (refer to FIG. 2). There is wavelength dependency in the beam emission direction of the grating 5, and it is desirable that the grating 5 sets different beam incident positions for each wavelength with respect to the optical path conversion optical system 7.

As shown in FIGS. 1 and 2, the lens 6 (scan lens) focuses the emitted beam L1 passing through the grating 5, and may form a focus inside the optical path conversion optical system 7.

The lens 6 (scan lens) collimates multiple beams $L_{\lambda 1}$ to $L_{\lambda 7}$ having different wavelengths.

As shown in FIG. 2, an optical axis direction D1 of a lens 6 is inclined with respect to optical axis direction D2 from a beam emission portion 1 to an optical path conversion optical system 7. In FIG. 2, the lens 6 of which the optical axis direction D1 is inclined is indicated by the solid line. For comparison, the lens 6 which is not inclined is indicated by the chain double-dashed line.

In the example, the optical axis direction D2 is aligned with the direction of a beam that is collimated by the lens 6 to travel toward the optical path conversion optical system 7.

An inclination angle A1 of the optical axis direction D1 of the lens 6 with respect to the optical axis direction D2 is set, as described below, so that a maximum difference in focal depth position of beams $L_{\lambda 1}$ to $L_{\lambda 7}$ having different wavelengths becomes smaller compared to the case where the lens 6 is not inclined (as depicted by the chain double-dashed line in FIG. 2). It is desirable that the inclination angle A1 be set so that the maximum difference in focal depth position of the beams $L_{\lambda 1}$ to $L_{\lambda 7}$ becomes the minimum.

As shown in FIGS. 3 and 4, the optical path conversion optical system 7 converts the optical path of the beam L1 emitted from one optical fiber 2 of the plurality of optical fibers 2, so that the beam is incident as the returned beam L2 (beam L) to the other optical fiber 2.

The optical path conversion optical system 7 includes a body portion 11 and an intermediate reflection portion 12 which is installed at the returning direction side of the body portion 11 (the left side in FIGS. 3 and 4) with a gap with respect to the body portion 11.

The body portion 11 includes a support portion 13 and a plurality of mirror elements 15 (15a, 15b, 15c, . . . ) which are installed at the surface on the returning direction side of the support portion 13. The mirror elements 15 may be disposed in parallel in an area along the surface on the returning direction side of the support portion 13, thereby forming a mirror element assembly 15A.

The inclination of each of the mirror elements 15 is adjustable, and when the reflection direction of the beam is controlled by adjusting the inclination, the optical path of the reflected beam can be set.

As the body portion 11, a DMD (Digital Micromirror Device) having a plurality of micromirror elements, each of which is individually actuatable, may be used.

The intermediate reflection portion 12 includes a frame 18 which has a plurality of window portions 17 allowing beams to pass therethrough and a plurality of intermediate mirrors 19 (19a to 19d) installed in the frame 18.

The intermediate mirrors 19 are installed at the surface on the emission direction (the right side in FIGS. 3 and 4) of the frame 18 so that the beam reflected from the mirror elements 15 is reflected toward another mirror element 15. The intermediate mirrors 19 are installed with an interval in the vertical direction in FIGS. 3 and 4. In the example shown in the drawing, each window portion 17 is formed between the intermediate mirrors 19 which are adjacent to each other in the vertical direction.

The optical path conversion optical system 7 converts the optical paths of the beams dispersed by the grating 5 into different optical paths in accordance with the mirror elements 15, so that the returned beam L2 can be incident to any one of the optical fibers 2.

For example, the returned beam L2 may be incident to the different optical fiber 2 in accordance with each wavelength. For this reason, the optical path conversion optical system 7 may function as a switch optical system. In this case, the optical processing device 10 functions as a wavelength-selective switch.

Since the optical path conversion optical system 7 may control the direction of the beam so as not to incident to the optical fiber 2, the optical path conversion optical system may select whether the beam of each wavelength is individually incident to one of the other optical fibers 2 or is not incident to any of the other optical fibers 2.

For this reason, the optical path conversion optical system 7 may also function as a block optical system. In this case, the optical processing device 10 functions as a wavelength blocker.

The optical path conversion optical system 7 may convert the optical path so that the beam is incident to the optical fiber 2 by attenuating the beam of each wavelength with a predetermined attenuation rate. For example, a beam of a predetermined wavelength may be incident to the optical fiber 2 while attenuating the beam by adjusting the reflection amount using the mirror elements 15.

For this reason, the optical path conversion optical system 7 may also function as a filter optical system. In this case, the optical processing device 10 functions as a wavelength filter.

As shown in FIGS. 1 to 3, the beam propagated inside the optical fiber 2 and the beam L1 emitted from the optical fiber 2 may be a wavelength multiplexed light containing multiple signal beams having different wavelengths.

The beam L1 emitted from the front end surface 2a of the optical fiber 2 is collimated by the lenses 3 and 4 (collimating lenses), and then is dispersed into multiple beams having different wavelengths by the grating 5.

The dispersed emitted beams L1 travels toward the optical path conversion optical system 7 while being focused by the lens 6 (scan lens).

As shown in FIGS. 3 and 4, in the optical path conversion optical system 7, the emitted beam L1 passes through each window portion 17 of the intermediate reflection portion 12 and arrives at each mirror element 15, and the beam reflected from the mirror element 15 travels toward the intermediate mirror 19.

For example, as shown in FIG. 4, the beam L1 emitted from the optical fiber 2B is reflected by the mirror element 15b, and then the reflected beams L3 and L4 having different wavelengths may respectively travel toward the intermediate mirrors 19a and 19b. The point where the emitted beam L1 is initially reflected by the mirror element 15 is referred to as a first reflection point R1 (refer to FIG. 4). In the example, the first reflection point R1 is the mirror element 15b.

The reflected beams L3 and L4 are respectively reflected by the intermediate mirrors 19a and 19b, the reflected beams L5 and L6 respectively travel toward the mirror elements 15a and 15c to be reflected by the mirror elements 15a and 15c, and then the reflected beam (returned beam L2) passes through the window portion 17 of the intermediate reflection portion 12 to travel toward the optical fibers 2A and 2C (output path) (refer to FIG. 3).

As shown in FIG. 4, the point where the beams L3 and L4 are reflected by the intermediate mirror 19 (19a and 19b) is referred to as an intermediate reflection point Ri.

The point where the beams L5 and L6 reflected from the intermediate mirror 19 are reflected by the mirror element 15 is referred to as a second reflection point R2. In the example, the second reflection point R2 is the mirror elements 15a and 15c.

Figure 5:
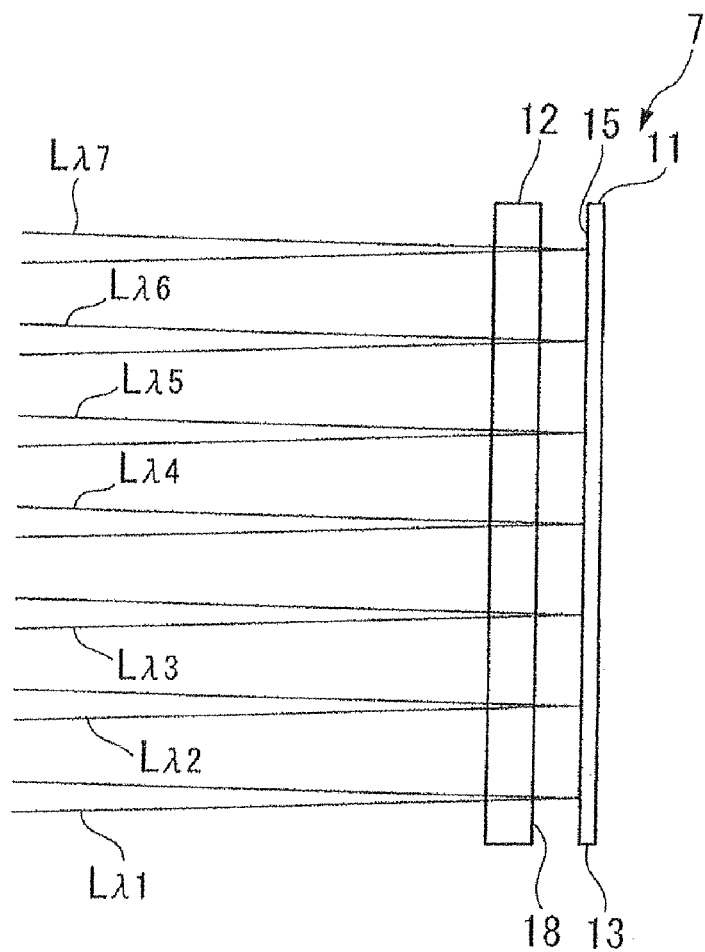
FIG. 5 is a schematic diagram illustrating the optical path conversion optical system of the optical processing device of FIG. 1.

As shown in FIGS. 1, 2, and 5, the emitted beam L1 is dispersed by a grating 5 into the beams $L_{\lambda 1}$ to $L_{\lambda 7}$ having different wavelengths, is focused, and arrives at the optical path conversion optical system 7 (especially, refer to FIG. 5).

Although it is not clearly shown in FIG. 5, since the focal depth position of the beam is dependent on the wavelength, the focal depth positions of the beams $L_{\lambda 1}$ to $L_{\lambda 7}$ may be different from each other. The depth direction indicates the rightward direction in FIGS. 1 to 5.

As shown in FIG. 4, it is desirable that the focal position of the emitted beam L1 (beams $L_{\lambda 1}$ to $L_{\lambda 7}$) be a first reflection point R1 or the vicinity thereof.

In the optical processing device 10, the inclination angle A1 of the lens 6 shown in FIG. 2 is set so that the maximum difference in focal depth position of the beams $L_{\lambda 1}$ to $L_{\lambda 7}$ becomes smaller compared to the case where the lens 6 is not inclined (as depicted by the chain double-dashed line in FIG. 2). It is desirable that the inclination angle A1 be set so that the maximum difference in focal depth position of the beams $L_{\lambda 1}$ to $L_{\lambda 7}$ becomes the minimum.

As an example, the case where the lens 6 is not inclined, the focal position of the beam $L_{\lambda 1}$ of the beams $L_{\lambda 1}$ to $L_{\lambda 7}$ is the shallowest, and the focal position of the beam $L_{\lambda 5}$ is the deepest will be explained.

By inclining the lens 6 (as depicted by the solid line in FIG. 2), the optical path up to the optical path conversion optical system 7 becomes shorter with regard to the beam $L_{\lambda 1}$, and the optical path becomes longer with regard to the beam $L_{\lambda 5}$.

For this reason, a difference between the focal position of the beam $L_{\lambda 1}$ and the focal position of the beam $L_{\lambda 5}$ (a distance in the depth direction) can be decreased.

Since variation (a difference between the maximum value and the minimum value) of the focal depth position of the beams $L_{\lambda 1}$ to $L_{\lambda 7}$ decreases, the focuses of the beams $L_{\lambda 1}$ to $L_{\lambda 7}$ can be formed at a position adjacent to the mirror element 15.

For this reason, the loss at the time of reflection may be reduced by decreasing the beam diameters of the beams $L_{\lambda 1}$ to $L_{\lambda 7}$ incident to the mirror element 15.

Accordingly, the high coupling efficiency can be obtained in the wide wavelength region without making the optical system complex, and hence the output characteristics may be improved.

As shown in FIGS. 1 and 2, the returned beam L2 is collimated by the lens 6, is focused by the lenses 3 and 4, and is incident to the front end surface 2a of the optical fiber 2.

Figure 6:
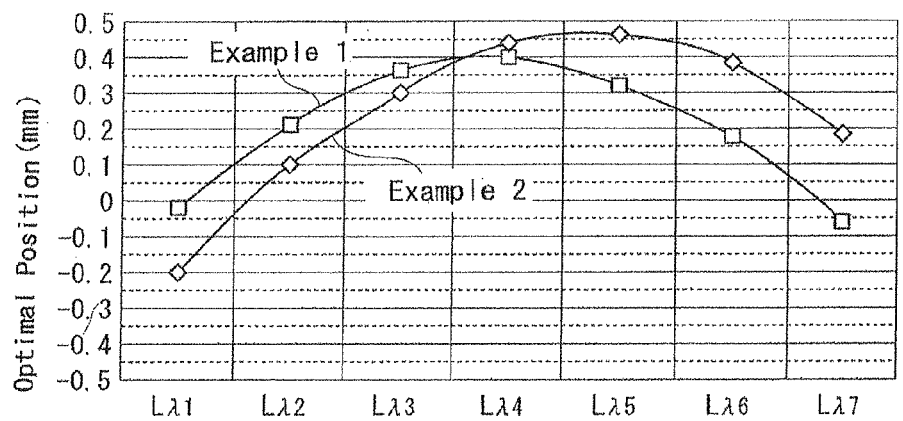
FIG. 6 is a graph illustrating a test result.

FIG. 6 is a graph illustrating a simulation result with respect to the inclination angle A1 of the lens 6. By setting the focal position of the beam to the optimal position of the mirror element 15, the distance from the reference point to the optimal position in the depth direction is obtained for each of the beams $L_{\lambda 1}$ to $L_{\lambda 7}$.

In the example 2 in which the lens 6 is not inclined (as depicted by the chain double-dashed line), variation of the optimal position of the beams $L_{\lambda 1}$ to $L_{\lambda 7}$ increases, but in the example 1 (as depicted by the solid line of FIG. 2), variation of the optimal position of the beams $L_{\lambda 1}$ to $L_{\lambda 7}$ decreases by inclining the lens 6.

In the example 1, a difference between the shallowest optimal position and the deepest optimal position is substantially minimal.

Figure 7:
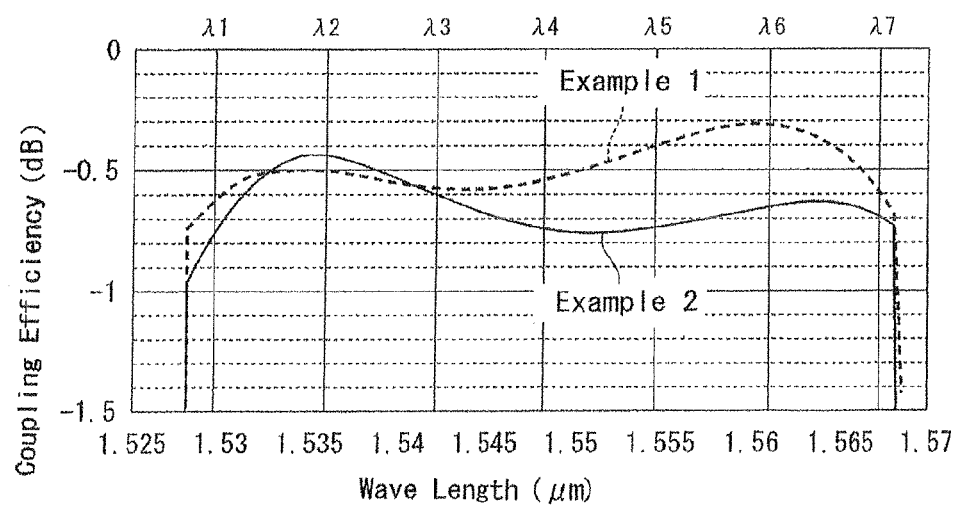
FIG. 7 is a graph illustrating a test result.

FIG. 7 is a graph illustrating a simulation result with respect to the inclination angle A1 of the lens 6. The coupling efficiency with respect to the optical fiber 2 (output path) is obtained for each of the beams $L_{\lambda 1}$ to $L_{\lambda 7}$ (respectively having wavelengths λ1 to λ7).

In the example 2 in which the lens 6 is not inclined, variation of the coupling efficiency of the beams $L_{\lambda 1}$ to $L_{\lambda 7}$ increases, but in the example 1, variation of the coupling efficiency of the beams $L_{\lambda 1}$ to $L_{\lambda 7}$ decreases by inclining the lens 6. For this reason, in the example 1, the high coupling efficiency is obtained in the wide wavelength region, and hence the output characteristics can be improved.

Figure 8:
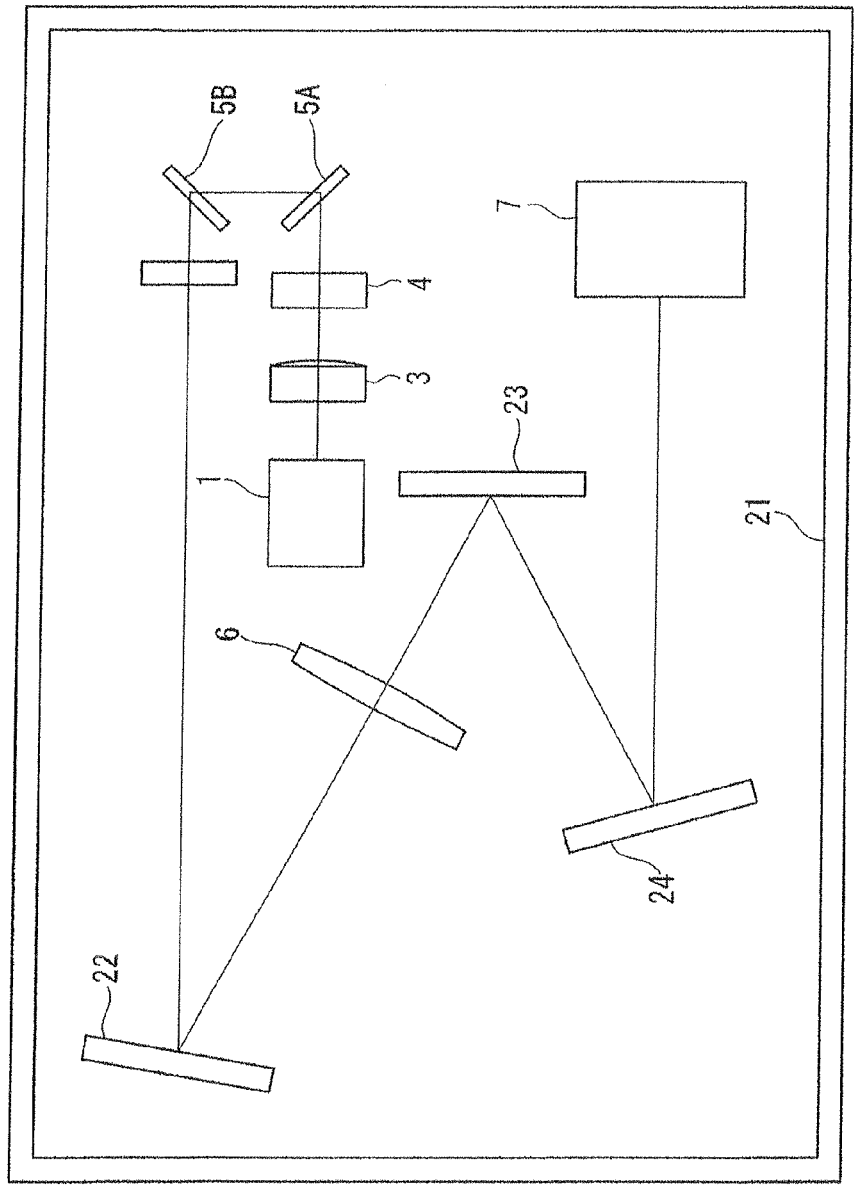
FIG. 8 is a configuration diagram illustrating an example of a specific configuration of the optical processing device of FIG. 1.

FIG. 8 illustrates an example of a specific configuration of the optical processing device 10. The optical processing device 10 shown in the drawing includes a case 21 that is provided with: the beam emission portion 1; the lens 3 and 4 (collimating lenses); the gratings 5A and 5B which disperse the beam from the lenses 3 and 4; the lens 6 (scan lens); and the optical path conversion optical system 7. The symbols 22 to 24 denote the mirrors.

The number of the optical fibers of the beam emission portion 1 is not particularly limited, and may be arbitrarily, for example, three or more. Further, the number of the mirror elements of the optical path conversion optical system may be arbitrarily set to one or more. Furthermore, the number of times of reflecting the beam in the mirror element and the intermediate mirror is not limited to the above-described example.

DESCRIPTION OF SYMBOLS

1: BEAM EMISSION PORTION
2: OPTICAL FIBER
3, 4: LENS (COLLIMATING LENS)

5: GRATING (DISPERSION ELEMENT)
6: LENS (CONDENSER LENS)
7: OPTICAL PATH LENGTH CONVERSION OPTICAL SYSTEM
8: OPTICAL PATH LENGTH ADJUSTMENT PORTION
15: MIRROR ELEMENT
19: INTERMEDIATE MIRROR
L1: EMITTED BEAM
L2: RETURNED BEAM
D1: OPTICAL AXIS DIRECTION OF A LENS (CONDENSER LENS)
D2: OPTICAL AXIS DIRECTION FROM A BEAM EMISSION PORTION TO AN OPTICAL PATH CONVERSION OPTICAL SYSTEM
R1: FIRST REFLECTION POINT
R2: SECOND REFLECTION POINT
Ri: INTERMEDIATE REFLECTION POINT
A1: INCLINATION ANGLE OF THE OPTICAL AXIS DIRECTION OF THE LENS (CONDENSER LENS)

What is claimed is:

1. An optical processing device, comprising:
a plurality of optical ports;
a dispersion element for spatially dispersing an optical beam received from the optical ports into a plurality of wavelength components;
an optical path conversion system for receiving the plurality of wavelength components and selectively directing at least one of the wavelength components to one of the optical ports; and
at least a first optical element for focusing each of the plurality of wavelength components received by the optical path conversion system, said optical path conversion system and said at least first optical element being arranged to reduce a distance between a plane in which one of the wavelength components is focused by the first optical element and a plane in which any of the other wavelength components are focused with respect to a distance between the first and second focal planes that would arise from an inherent dependence of focal length on wavelength.

2. The optical processing device of claim 1 wherein the first optical element is configured to change an optical path length therethrough in a direction perpendicular to its optical axis.

3. The optical processing device of claim 2 in which the optical axis of the first optical element is inclined with respect to an optical axis of the optical ports so that the distance between the first and second focal planes is reduced.

4. The optical processing device of claim 3 wherein the first and second planes in which each of the plurality of wavelength components is focused are approximately coincident with the actuatable mirror elements.

5. The optical processing device of claim 1 said wherein said optical path conversion system includes a digital micromirror device (DMD) from which at least one wavelength component is reflected at least twice before being directed to a selected one of optical ports.

6. The optical processing device of claim 5 wherein said DMD includes an array of individually actuatable mirror elements for selectively reflecting the wavelength components, and wherein the optical path conversion system further includes a second optical element for receiving the reflected wavelength components from the DMD and directing them back onto selected ones of the mirror elements of the DMD.

7. The optical processing device of claim 6 wherein the second optical element includes a plurality of planar mirrors having reflective surfaces that face reflective surfaces of the mirror elements of the DMD.

8. The optical processing device of claim 1 wherein the first optical element includes a condenser lens.

9. The optical processing device of claim 1 wherein the optical path conversion system is configured to selectively direct each of the wavelength components to a different one of the optical ports.

10. The optical processing device of claim 1 wherein the at least first optical element includes a plurality of optical elements.

11. An optical processing device, comprising:
a plurality of optical ports;
a dispersion element for spatially dispersing an optical beam received from the optical ports into a plurality of wavelength components;
an optical path conversion system for receiving the plurality of wavelength components and selectively directing at least one of the wavelength components to one of the optical ports; and
at least a first optical element for focusing each of the plurality of wavelength components received by the optical path conversion system, said at least first optical element being arranged to change an optical path length therethrough in a direction perpendicular to its optical axis.

12. The optical processing device of claim 11 wherein the first optical element is arranged to reduce a distance between a plane in which one of the wavelength components is focused by the first optical element and a plane in which any of the other wavelength components are focused with respect to a distance between the first and second focal planes that would arise from an inherent dependence of focal length on wavelength.

* * * * *